(12) United States Patent
Xu et al.

(10) Patent No.: US 10,859,763 B2
(45) Date of Patent: Dec. 8, 2020

(54) HOLLOW-CORE ANTIRESONANT FIBER WITH NESTED SUPPORTING RINGS AND ITS DESIGN METHOD

(71) Applicant: BEIHANG UNIVERSITY, Beijing (CN)

(72) Inventors: Xiaobin Xu, Beijing (CN); Yunhao Zhu, Beijing (CN); Ningfang Song, Beijing (CN); Fuyu Gao, Beijing (CN); Jing Jin, Beijing (CN); Xiaoyang Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/669,489

(22) Filed: Oct. 30, 2019

(65) Prior Publication Data

US 2020/0257041 A1    Aug. 13, 2020

(30) Foreign Application Priority Data

Nov. 13, 2018    (CN) .......................... 2018 1 1344050

(51) Int. Cl.
*G02B 6/02* (2006.01)
*C03B 37/027* (2006.01)

(52) U.S. Cl.
CPC .... *G02B 6/02328* (2013.01); *C03B 37/02781* (2013.01); *G02B 6/02361* (2013.01)

(58) Field of Classification Search
CPC ............ G02B 6/02328; G02B 6/02366; G02B 6/02361; C03B 37/02781; C03B 2203/22;
(Continued)

(56) References Cited

U.S. PATENT DOCUMENTS 10,139,560 B2 * 11/2018 Poletti ................. H01S 3/06712
10,527,782 B2 *  1/2020 Lyngsoe ............ G02B 6/02328
(Continued)

FOREIGN PATENT DOCUMENTS

CN        105807363 A   *  7/2016    ............... G02B 6/02
CN        108549128 A   *  9/2018    ......... G02B 6/02328
(Continued)

OTHER PUBLICATIONS

Belardi et al., Hollow antiresonant fibers with reduced attenuation, Apr. 1, 2014, Optics Letters, vol. 39, Issue 7, pp. 1853-1856.*
(Continued)

*Primary Examiner* — Ryan A Lepisto
*Assistant Examiner* — Erin D Chiem
(74) *Attorney, Agent, or Firm* — Pai Patent & Trademark Law Firm; Chao-Chang David Pai

(57) ABSTRACT

A hollow-core antiresonant fiber (HC-ARF) with nested supporting rings (NSRs) has a fiber structure that includes from the inside out a fiber core, a first silica antiresonant ring (SARR), a first air antiresonant ring (AARR), a second SARR, a second AARR and an external silica wall. The fiber structure further includes a first NSR within the first AARR and a second NSR within the second AARR. The HC-ARF with NSRs has advantages and benefits of low confined loss (CL), large bandwidth, simple structure and very good bending characteristics. Therefore, the application fields of HC-ARF are greatly expanded.

20 Claims, 6 Drawing Sheets

(58) Field of Classification Search
CPC ............ C03B 2203/24; C03B 2203/10; C03B 2203/32; C03B 2203/16
See application file for complete search history.

(56) References Cited

U.S. PATENT DOCUMENTS

2020/0156987 A1* 5/2020 Wheeler ............ G02B 6/02328
2020/0241200 A1* 7/2020 Wang ................ G02B 6/02328

FOREIGN PATENT DOCUMENTS

| CN | 111257992 A * | 6/2020 | ............... G02B 6/02 |
| EP | 3199991 A1 * | 8/2017 | ......... G02B 6/02328 |
| GB | 2566466 A * | 3/2019 | ......... G02B 6/02328 |
| WO | WO-2004083918 A1 * | 9/2004 | ....... B29D 11/00721 |
| WO | WO-2020030894 A1 * | 2/2020 | ......... G02B 6/02371 |

OTHER PUBLICATIONS

Kosolapov et al., Hollow-core revolver fibre with a double-capillary reflective cladding, Mar. 2016, Quantum Electronics, vol. 46, Issue 3, p. 1.*

Van Newkirk et al., Anti-resonant hollow core fiber for precision timing applications, Aug. 23, 2017, Proceedings SPIE, Photonic Fiber and Crystal Devices: Advances in Materials and Innovations in Device Application XI.*

Poletti et al., Optimising the performances of hollow antiresonant fibres, 2011, 37th European Conference and Exhibition on Optical Communication, pp. 1-3.*

Belardi et al., Negative curvature fibers with reduced leakage loss, OFC 2014, San Francisco, CA, 2014, pp. 1-3.*

* cited by examiner

HOLLOW-CORE ANTIRESONANT FIBER WITH NESTED SUPPORTING RINGS AND ITS DESIGN METHOD

BACKGROUND OF THE INVENTION

1. Field of the Invention

The invention relates generally to microstructured optical fibers (MOFs). More specifically, the invention relates to a hollow-core antiresonant fiber (HC-ARF) with nested supporting rings (NSRs) and a method of designing the same.

2. Background Art

The HC-ARF is a new kind of MOFs based on the antiresonant effect. The antiresonant effect is generated by the thickness of silica or air in the HC-ARF that satisfies a certain relationship with the wavelength of the light entering the HC-ARF to confine the light in the air core of the HC-ARF. Due to the special structure and guidance mechanism, HC-ARFs exhibit many advantages compared to traditional optical fibers, including large bandwidth, excellent environmental adaptability (to temperature, electromagnetic field, space radiation, etc.), extremely low nonlinearity, high damage threshold, ultralow latency, and so on. Therefore, HC-ARFs have a great potential in the application of power delivery, nonlinearity optics, fiber optic sensors, and so on. Since HC-ARFs were first conceived, many research efforts have been made in this field, especially concerning the characteristics of loss and bandwidth, which are significant to the fiber optic sensing.

However, the optical loss in HC-ARFs is much larger than the traditional single mode fibers (SMFs). The main reason is that light in HC-ARFs transmits in the leaky mode and the main kind of loss is confined loss (CL). There exist two ways of decreasing the confined loss: one is increasing the core size but the mode area would also be larger, making it hard for HC-ARFs to connect and couple with common SMFs; the other is increasing the number of antiresonant rings, such as the hollow-core Bragg fibers which have many antiresonant rings with various refractive indices. In an ideal case, the core and low refractive index antiresonant rings consist of air and the high refractive index antiresonant rings consist of silica, forming an ideal structure with only two media because of their large difference in refractive index and matched thermodynamic characteristics. Nevertheless, such a structure is impractical because its silica antiresonant rings (SARRs) lack structural support. For this reason, the hollow-core Bragg fibers inevitably comprise three media, which are air, low refractive index solid material and high refractive index solid material, so the refractive index difference is low and the thermodynamic characteristics are unmatched.

Therefore, there is a need for designing a practical and simple structure in the air antiresonant rings (AARRs) to support the SARRs without affecting the air antiresonant effect.

BRIEF SUMMARY OF THE INVENTION

Accordingly, to solve the above-mentioned problems, the present invention provides an HC-ARF with NSRs, which are disposed within the AARRS and substantially tangent to the SARRs to support them. The present invention also provides a method of designing the HC-ARF with NSRs.

The fiber of the invention includes, from the inside out, a fiber core, a first SARR, a first AARR, a second SARR, a second AARR and an external silica wall. The fiber further includes a first NSR within the first AARR and a second NSR within the second AARR.

The first SARR, the first AARR, the second SARR and the second AARR are concentric annular structures which have the same center point O. The inner wall of the first NSR is substantially tangent to the outer side of the first SARR at a point A, and at the same time the outer wall of the first NSR is substantially tangent to the inner side of the second SARR at a point B. The inner wall of the second NSR is substantially tangent to the outer side of the second SARR at a point C, meanwhile the outer wall of the second NSR is substantially tangent to the inner side of the external silica wall at a point D. The silica antiresonant thicknesses of the first SARR and the second SARR respectively are 1910 nm and 1175 nm, respectively. The air antiresonant thicknesses of the first and the second AARRs both are 13 μm. The silica antiresonant thicknesses of the first and second NSRs both are 570 nm. The line AB connecting points A, B is perpendicular to the line CD connecting points C, D at the center point O. The first NSR is nested in the first SARR at point A and in the second SARR at point B. Similarly, the second NSR is nested in the second SARR at point C and in the external silica wall at point D. The nested depths for the first and second NSRs are 1/20 of the thickness of the first NSR and the second NSR, respectively.

In addition, the method in accordance with the present invention for designing HC-ARF with NSRs includes the following steps:

Step 1: determine the silica antiresonant thicknesses of the first SARR and the second SARR, respectively.

Step 2: determine the air antiresonant thicknesses of the first AARR and the second AARR to be the same and equal to 0.65r, where r is the radius of the fiber core.

Step 3: set the silica resonant thickness p1 of the first NSR and the silica resonant thickness p2 of the second NSR to the same value p.

Step 4: determine the locations of points A, B, C and D to ensure that line AB and line CD are perpendicular to each other.

Step 5: determine the nested depths q of the first NSR and the second NSR, that is, to fix the ratio of q and p.

Step 6: redesign p1 and p2 after the nested depths q are obtained in Step 5.

The advantages and benefits of the fiber structure and its design method according to the invention are:

(1) The theoretical CL of the HC-ARF structure with NSRs according to the present invention is ultralow to 0.1 dB/km at 1550 nm wavelength, which is similar to the loss of common SMFs and lower than the CL of other ordinary HC-ARFs;

(2) The transmission bandwidth of the HC-ARF structure with NSRs according to the present invention is large, which is 300 nm from 1355 nm to 1655 nm when the CL is lower than 1 dB/km;

(3) The structure of the HC-ARF with NSRs according to the present invention is relatively simple. There are only four silica rings and external silica wall, thus it is easy to draw the fiber;

(4) The bending characteristic of the HC-ARF with NSRs according to the invention is relatively better, compared with other ordinary HC-ARFs. When the bending radius is 20 mm, the bending loss (BL) in four main bending directions is lower than 3 dB/km, which is acceptable in most applications of the fiber.

Therefore, the application fields of the HC-ARF are greatly expanded and the practicability of HC-ARF is improved at the same time.

DESCRIPTION OF THE PREFERRED EMBODIMENT

The present invention will be further described in detail below in conjunction with the accompanying figures and steps.

Figure 1:
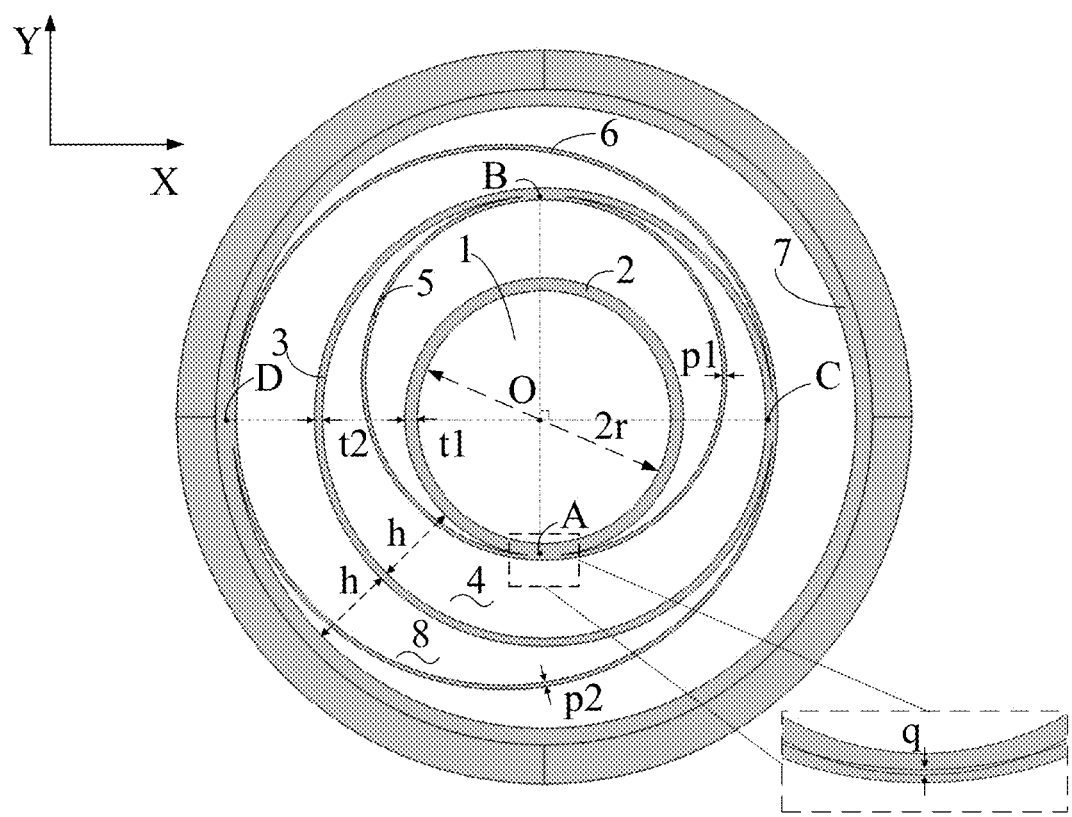
FIG. 1 is a cross-sectional profile of an HC-ARF with NSRs according to the present invention.

The present invention provides an HC-ARF with NSRs. As FIG. 1 shows, the cross-sectional profile of the HC-ARF with NSRs according to the present invention mainly includes, from the inside out, a fiber core 1, a first SARR 2, a first AARR 4, a second SARR 3, a second AARR 8 and an external silica wall 7. The HC-ARF structure further includes a first NSR 5 within the first AARR 4 and a second NSR 6 within the second AARR 8. As illustrated in FIG. 1, the first SARR 2 has a silica antiresonant thickness t1, the second SARR 3 has a silica antiresonant thickness t2, and it is assumed that the first AARR 4 and the second AARR 8 each have an air antiresonant thickness h. The first NSR 5 has a silica resonant thickness p1 and the second NSR 6 has a silica resonant thickness p2. The first SARR 2, the first AARR 4, the second SARR 3 and the second AARR 8 are concentric annular structures having the same center point O, which is also the center point of the fiber core 1. The inner wall of the first NSR 5 is substantially tangent to the outer side of the first SARR 2 at the point A and at the same time the outer wall of the first NSR 5 is substantially tangent to the inner side of the second SARR 3 at the point B. The inner wall of the second NSR 6 is substantially tangent to the outer side of the second SARR 3 at the point C, and meanwhile the outer wall of the second NSR 6 is substantially tangent to the inner side of the external silica wall 7 at the point D. Theoretically, it is preferable for the first NSR 5 to be strictly or geometrically tangent to the first SARR 2 and the second SARR 3, and for the second NSR 6 to be strictly or geometrically tangent to the second SARR 3 and the external silica wall 7. However, practically, the inner wall of the first NSR 5 will slightly overlap or merge with the outer side of the first SARR 2 at the nested point A for a depth q in the radial direction, as illustrated in FIG. 1. Therefore, they are "substantially tangent" to each other. Similarly, the outer wall of the first NSR 5 will slightly overlap or merge (and therefore substantially tangent) with the inner side of the second SARR 3 at the nested point B for a radial depth. Moreover, the inner wall of the second NSR 6 will slightly overlap or merge (and therefore substantially tangent) with the outer side of the second SARR 3 at the nested point C for a radial depth, and the outer wall of the second NSR 6 will slightly overlap or merge (and therefore substantially tangent) with the inner side of the external silica wall 7 at the nested point D for a radial depth. Although the radial depths at the nested points A, B, C, D may be different from one another, they are assumed to have the same value q in some embodiments of the present invention, and will be called "nested depths" in the following description. In other words, the nested points A and B are nested inside the inner wall and the outer wall, respectively, of the first NSR 5 for a radial nested depth q, whereas the nested points C and D are nested inside the inner wall and the outer wall, respectively, of the second NSR 6 for a radial nested depth q.

As shown in FIG. 1, when a rectangular coordinate system is set up in the cross-sectional profile of the invention, with the x-axis corresponding to the horizontal direction and the y-axis corresponding to the vertical direction, the x-axis and y-axis directions correspond to two fundamental modes respectively, which have different values of CL, represented by x-CL and y-CL in this case.

Before proceeding to the design of the present invention, the basic parameters of the HC-ARF with NSRs should be set up at first. We choose 1550 nm as the fiber's transmission wavelength λ which is common in optical fiber communications. The radius r of the fiber core 1 is set to 20 μm, which is similar to the radius of the fiber core of other common HC-ARFs. All simulated results of data and figures were obtained by utilizing a computer running a finite element simulating software such as COMSOL MULTIPHYSICS.

Using the fiber structure described above, according to the method of the present invention, the HC-ARF with NSRs is designed specifically in the following steps:

Step 1: Calculate the silica antiresonant thickness t1 of the first SARR 2 and the silica antiresonant thickness t2 of the second SARR 3.

Figure 2:
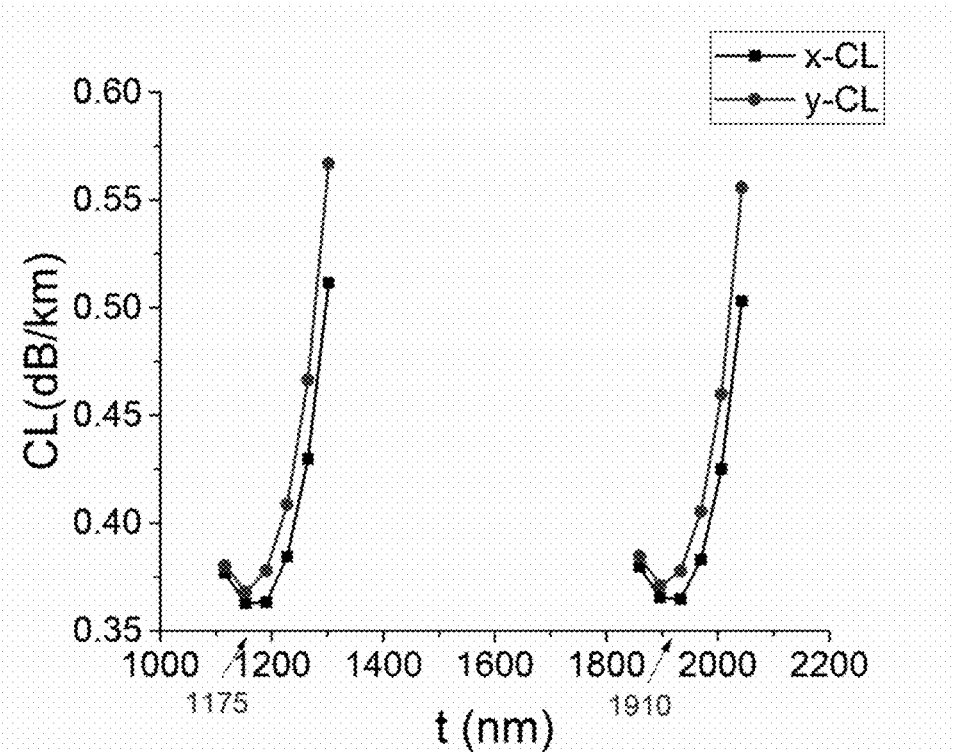
FIG. 2 shows the simulated dependence of the CL contribution of the HC-ARF with NSRs of the present invention on the silica antiresonant thickness of the first SARR and the silica antiresonant thickness of the second SARR without regard to the NSRs at a fixed core radius and wavelength.

The first SARR 2 and the second SARR 3 both are silica antiresonant rings, and the design formula for the thickness of a silica antiresonant ring is:

$$t = \frac{(2m+1)\lambda}{4\sqrt{n^2-1}} \quad (1)$$

where t is the silica antiresonant thickness of SARR; m is a natural number; λ is the transmission wavelength which is set to 1550 nm; n is the refractive index of silica which is 1.445. By using the formula (1), three theoretical values of t are calculated, namely t=372 nm if m=0, t=1116 nm if m=1, t=1860 nm if m=2. Because the NSR's influence on the SARR and the AARR is smaller when t is larger, we choose 1860 nm and 1116 nm as the theoretical values of the first SARR 2 and the second SARR 3, respectively. Subsequently the two theoretical values of t are used as starting values to find the optimized values of t using the simulated results shown in FIG. 2. The simulated results in FIG. 2 were obtained assuming h=0.65r, t1=t2, and no NSRs in the HC-ARF, where h is the air antiresonant thickness of the first AARR 4 and also the second AARR 8. The optimized values of t are larger than the theoretical values, and are 1910 nm and 1175 nm, respectively. Therefore, the optimal values of the silica antiresonant thickness t1 of the first SARR 2 and the silica antiresonant thickness t2 of the second SARR 3 are set to 1910 nm and 1175 nm, respectively.

Alternatively, t1 and t2 may be set to 1175 nm and 1910 nm, respectively. Moreover, t1 and t2 may be both set to either 1175 nm or 1910 nm. However, for the purpose of describing the design method of the present invention, t1 and t2 are set to 1910 nm and 1175 nm, respectively.

Step 2: Design the air antiresonant thicknesses h of the first AARR 4 and the second AARR 8.

Figure 3:
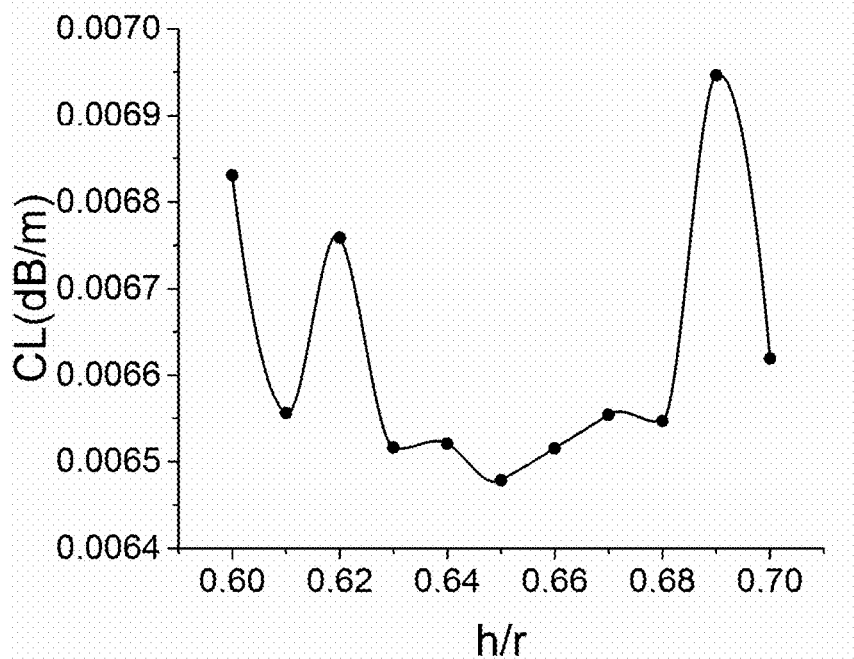
FIG. 3 shows the simulated dependence of the CL contribution of the HC-ARF with NSRs on the air antiresonant thicknesses without regard to the NSRs at a fixed core radius and wavelength.

The design formula of AARR thickness is:

$$h = \frac{\lambda}{4\sqrt{1-n_{eff}^2}} \approx \frac{\pi}{2u}r \cong 0.65r \quad (2)$$

where h is the air antiresonant thickness of AARR; $\lambda$ is the transmission wavelength which is 1550 nm; $n_{eff}=(\pi/2u)r$ is the effective mode refractive index of fundamental modes. When the formula (2) is simplified, h approximately corresponds to u=2.405, which is the first null of the zeroth-order Bessel function, r is the radius of the fiber core 1. Thus h approximately equals to 0.65r, which is independent of $\lambda$. The theoretical value of h is 13 μm when r=20 μm. Then the theoretical value of h is optimized using the simulated results shown in FIG. 3. In obtaining the results in FIG. 3, it is assumed that no NSRs are present in the HC-ARF. The optimized value of h/r is also 0.65. As discussed above, h/r is already set to 0.65 in obtaining the simulated results in FIG. 2. Therefore, the optimal values of the air antiresonant thickness h of the first AARR 4 and the second AARR 8 are both set to 13 μm.

Step 3: Predesign the silica resonant thickness p1 of the first NSR 5 and the silica resonant thickness p2 of the second NSR 6.

Figure 4:
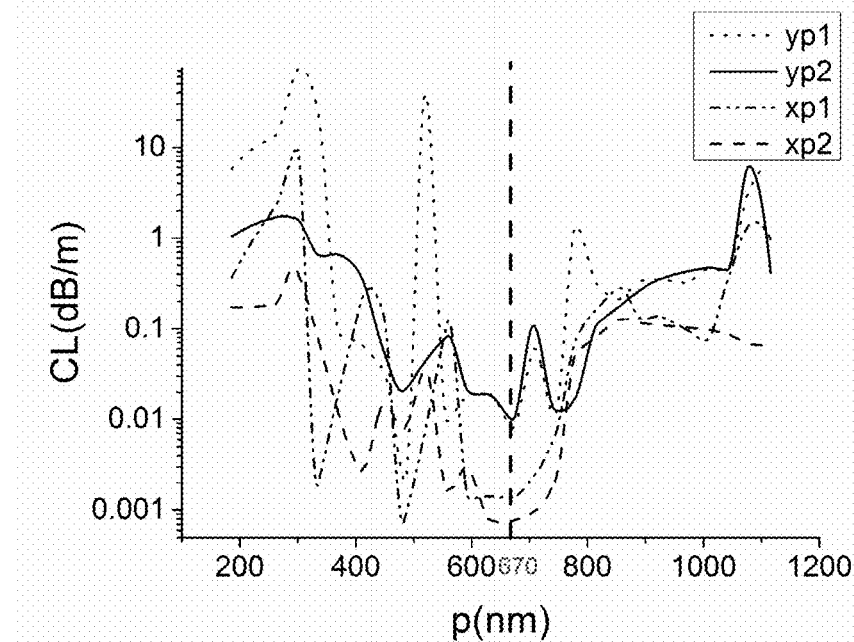
FIG. 4 shows the simulated dependence of the CL contribution of the HC-ARF with NSRs on the silica resonant thicknesses of the first NSR and the second NSR at a fixed core radius, wavelength and q/p=0.5 before the nested depths are changed.

The first NSR 5 within the first AARR 4 and the second NSR 6 within the second AARR 8 are eccentric annular structures with respect to the fiber core 1. In order to reduce the influence on the air antiresonant effects of the first AARR 4 and the second AARR 8, the silica resonant thicknesses p1 and p2 should be the silica resonant thicknesses p, namely p1=p2=p, p can be expressed as:

$$p = \frac{s\lambda}{2\sqrt{n^2-1}} \quad (3)$$

where p is the silica resonant thickness; s is a positive integer; $\lambda$ is the transmission wavelength which is 1550 nm; n is the refractive index of silica which is 1.445. By using the formula (3), two theoretical values of p are calculated, namely p=744 nm when s=1 and p=1488 nm when s=2. For decreasing the influence on the air antiresonant effects of the first AARR 4 and the second AARR 8, the smaller value of p is chosen, namely p=744 nm, as the theoretical value of p. The theoretical value of p is optimized using the simulated results shown in FIG. 4. In FIG. 4, xp1 and yp1 are the simulated dependence curves of x-CL and y-CL on the silica resonant thickness p1 of the first NSR 5 without the second NSR 6. The smallest value of CL is obtained at p1=670 nm, which is close to the theoretical value 744 nm. Curves xp2 and yp2 are the simulated dependence curves of x-CL and y-CL on the silica resonant thickness p2 of the second NSR 6 with p1=670 nm. According to the curves, the smallest value of CL is also obtained at p2=670 nm. Therefore, the predesigned values of p1 and p2 are both 670 nm, namely p1=p2=p=670 nm. In obtaining the results in FIG. 4, it is assumed that the nested depth q=0.5p and the angle between line AB and CD is 0.

Alternatively, the optimum value of p1 and p2 may be found by setting p1=p2 in calculating the simulated CL over a range of p1 (or p2) covering the theoretical value of p=744 nm.

Step 4: Determine the locations of points A, B, C, D, to ensure the angle θ between line AB and line CD is optimal.

Figure 5:
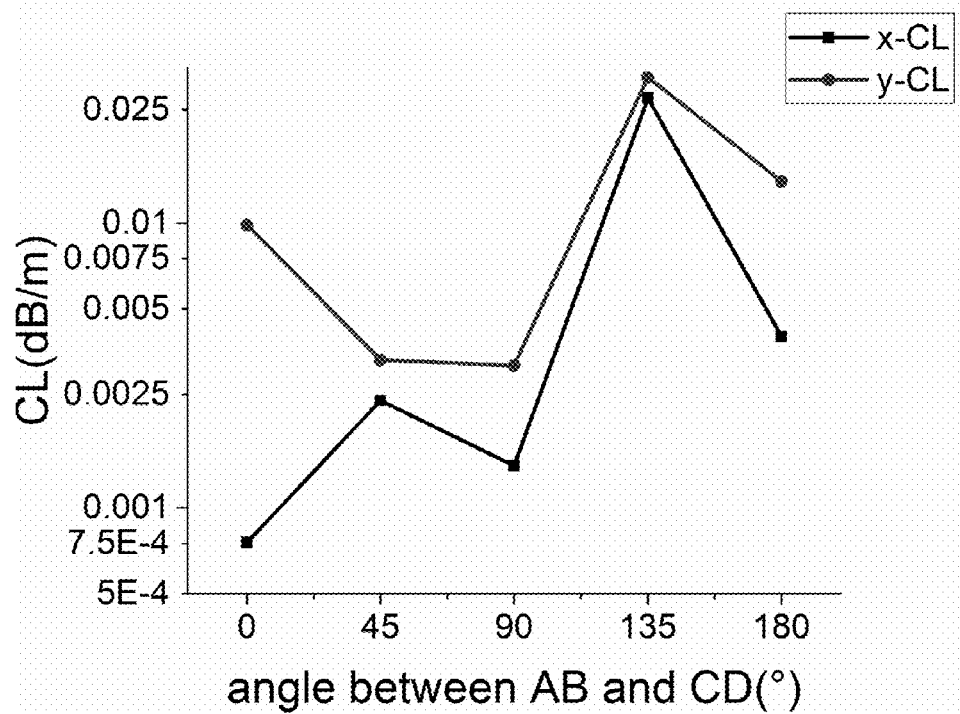
FIG. 5 shows the simulated dependence of the CL contribution of the HC-ARF with NSRs on the angle between line AB and line CD at a fixed core radius, wavelength and q/p=0.5 before the nested depths are changed.

The line AB connecting points A and B and the line CD connecting points C and D intersect at the point O, the center of the fiber core 1. Because the CL of the fundamental mode is decided by the larger value of x-CL or y-CL, the optimized angle θ between line AB and line CD can be found by keeping line AB in the vertical direction and rotating line CD on point O. The angles rotated are 0, 45, 90, 135, 180 degrees, which represent main situations. As shown in FIG. 5, y-CL is larger than x-CL in all cases and y-CL is smallest when the angle θ is 90 degrees. Therefore, the optimized value of angle θ is 90 degrees, that is to say, line AB and line CD are perpendicular at point O. In obtaining the results in FIG. 5, the value of q/p is kept at 0.5.

Step 5: Design the nested depths q of the first NSR 5 and the second NSR 6, that is to say, fix the ratio of q and p.

Figure 6:
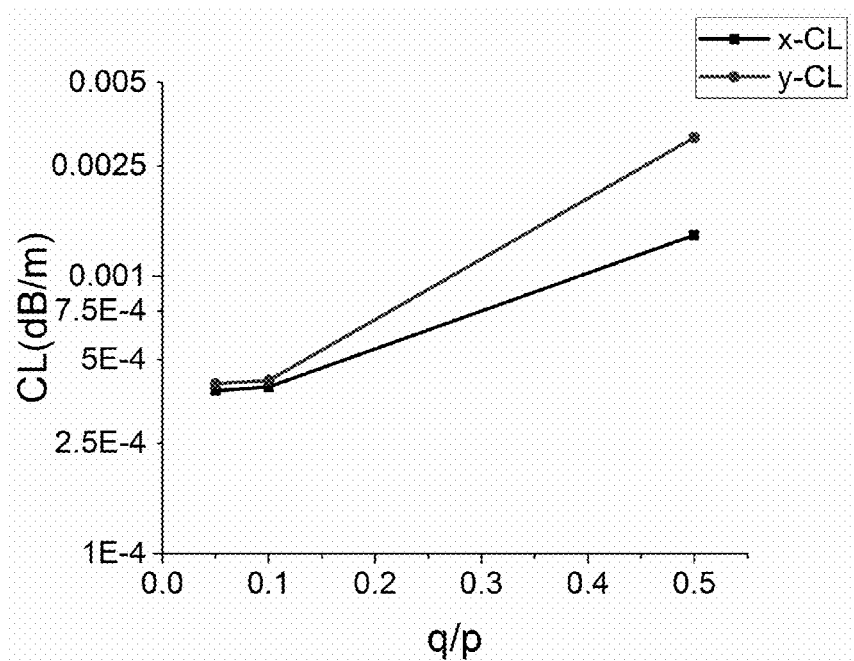
FIG. 6 shows the simulated dependence of the CL contribution of the HC-ARF with NSRs on the value of q/p at a fixed core radius and wavelength.

In practical situations, as discussed above, one ring is always nested or merged a little in the other ring even if they are preferably tangent at a point—see FIG. 1. In other words, the two rings overlap or merge for a radial depth (i.e. nested depth) q and they are "substantially tangent" to each other. Moreover, the values of the nested depths q would greatly affect the value of CL. For this reason, the nested depths q of the first NSR 5 and the second NSR 6 should be designed through simulating x-CLs and y-CLs at different values of q/p. The value of q/p is 0.5 in Step 4 (FIG. 5). As shown in FIG. 6, the CLs are reduced by an order of magnitude as q/p varies from 0.5 to 0.05 and the practical case is similar to q/p=0.05. Therefore, the nested depths q of the first NSR 5 and the second NSR 6 are designed as one twentieth of p.

Step 6: Redesign p1 and p2, the silica resonant thicknesses of the first NSR 5 and the second NSR 6, respectively, after the nested depth q is changed in Step 5.

Figure 7:
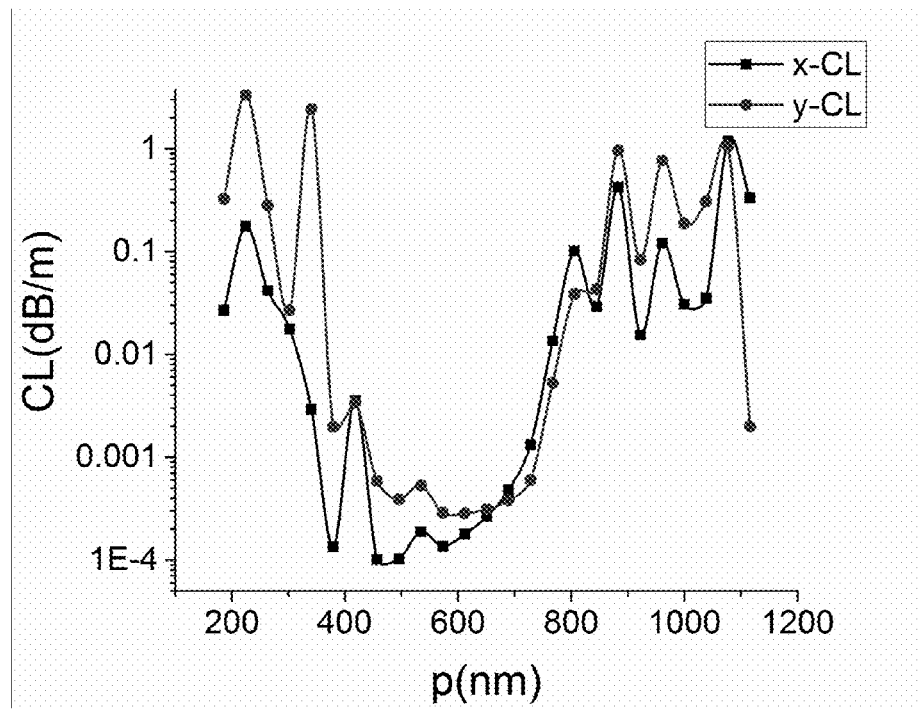
FIG. 7 shows the simulated dependence of the CL contribution of the HC-ARF with NSRs on the silica resonant thicknesses of the first NSR and the second NSR at a fixed core radius and wavelength after the nested depths are changed.

The optimized value of p1 and p2 are changed after Steps 4 and 5, so they should be redesigned. However, according to the results from Step 3, p1=p2=p is assumed in this Step. By keeping p1=p2=p, q/p=0.05, and θ=90 degrees, the simulated dependence of the CL contributions of the HC-ARF with NSRs on p is shown in FIG. 7. It is found that the smallest CL occurs when p is nearly 570 nm. Therefore, both the redesigned values of p1 and p2 are finally determined to be 570 nm.

Through the design method of the invention mentioned above, the HC-ARF with NSRs have been designed specifically. The silica antiresonant thicknesses t1 and t2 of the first SARR 2 and the second SARR 3, respectively, are 1910 nm and 1175 nm; the air antiresonant thicknesses h of the first AARR and the second AARR are both 13 μm; the silica resonant thicknesses p1 of the first NSR 5 and p2 of the second NSR 6 are both 570 nm; line AB and line CD are perpendicular at point O; the ratio of the nested depths q to p (p1 or p2) is 0.05, i.e. q=28.5 nm.

Figure 8:
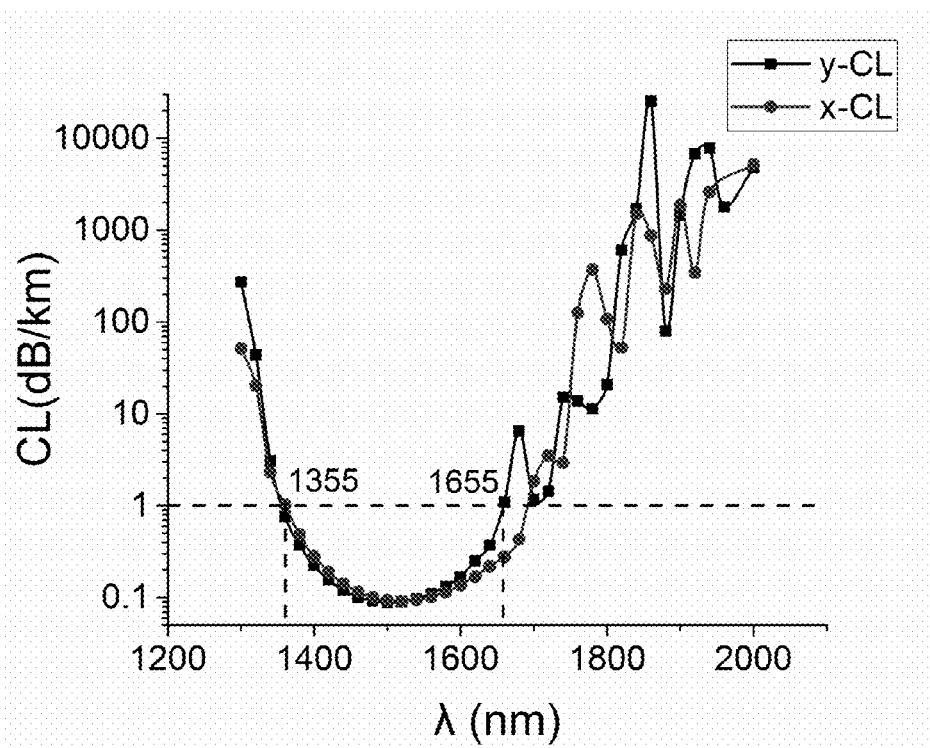
FIG. 8 shows the simulated CL spectra of the HC-ARF with NSRs of the present invention.

FIG. 8 shows the simulated CL spectra of the HC-ARF with NSRs designed according to the Steps described above. According to FIG. 8, the CL is lowest at λ=1550 nm and is about 0.1 dB/km and the bandwidth is large which is 300 nm from 1355 nm to 1655 nm when the CL is lower than 1 dB/km.

Figure 9A:
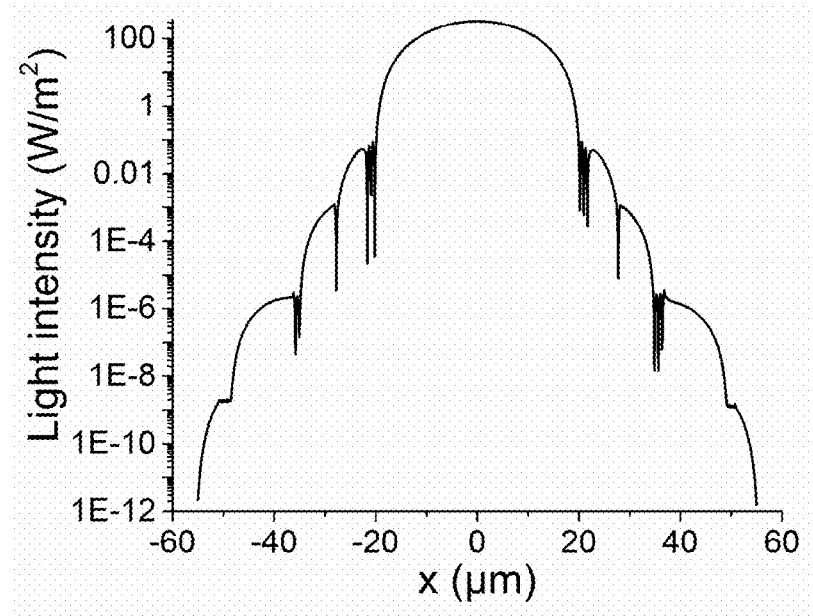
FIG. 9A and FIG. 9B show the simulated light intensity distributions of the HC-ARF with NSRs in the horizontal and vertical directions, respectively.
Figure 9B:
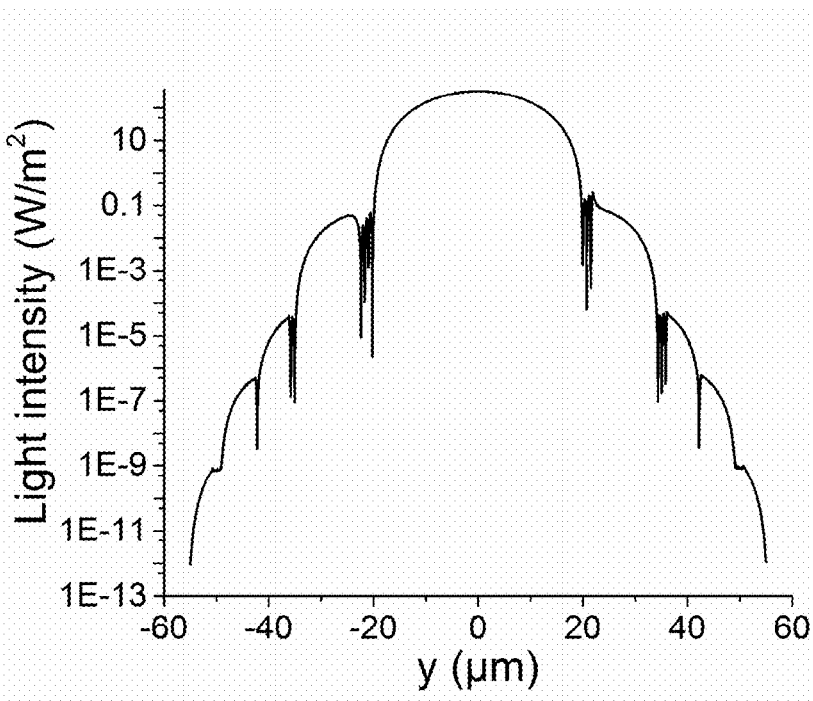

FIG. 9A and FIG. 9B respectively show the simulated light intensity distributions of the HC-ARF with NSRs in the horizontal and vertical directions. According to the two figures, most of the light is effectively confined in the fiber core 1 in two directions. The simulated light intensity fluctuates in the locations of the first SARR 2, the second SARR 3, the first NSR 5 and the second NSR 6 because of the resonance of light, but the overall distribution of simulated light intensity decreases rapidly from inside to outside.

Figure 10:
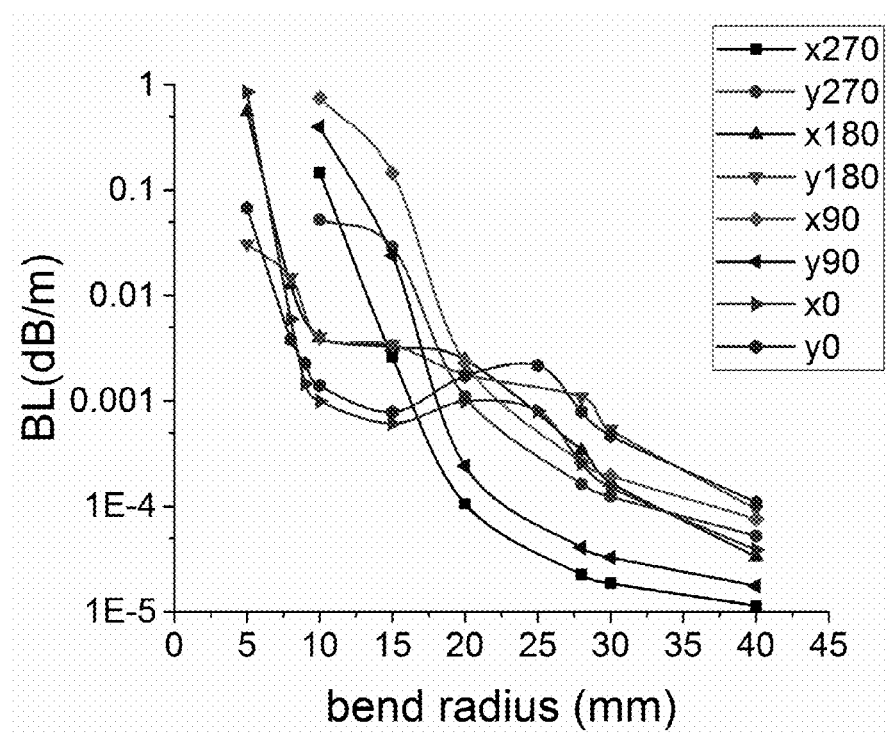
FIG. 10 shows the simulated BL of the HC-ARF with NSRs on the bending radius in four main bending directions.

FIG. 10 shows the dependence of the simulated BL of the HC-ARF with NSRs on the bending radius in four main bending directions. Specifically, x0 and y0 represent x-CL and y-CL when the bending direction is the negative direction of x-axis in FIG. 1. Similarly, x90 and y90 represent x-CL and y-CL in the positive direction of y-axis in FIG. 1, x180 and y180 represent x-CL and y-CL in the positive direction of x-axis in FIG. 1, and x270 and y270 represent x-CL and y-CL in the negative direction of y-axis in FIG. 1. According to the results, the BL is largest in the positive direction of y-axis and lowest in the negative direction of y-axis. When the bending radius is 20 mm, the BL is lower than 3 dB/km in all four bending directions. Thus, the HC-ARF with NSRs according to the present invention has excellent bending characteristics when compared to the common HC-ARFs.

Through the design method of the invention mentioned above, the fiber core 1 of the HC-ARF with NSRs is 20 μm. The CL at 1550 nm is 0.1 dB/km, which is in the same magnitude as common SMFs and lower than common HC-ARFs. When compared to common SMFs, hollow-core photonic bandgap fibers, even common HC-ARFs, the HC-ARF with NSRs of the present invention has larger bandwidth, which is 300 nm from 1355 nm to 1655 nm when the CL is lower than 1 dB/km. Furthermore, the relatively simple structure of the HC-ARF with NSRs, which includes four rings and external silica wall 7, is advantageous for fiber drawing. At last, the HC-ARF with NSRs has very good bending characteristics compared to common HC-ARFs. When the bending radius is 20 mm, the BL is lower than 3 dB/km in all four bending directions.

The invention provides a HC-ARF with NSRs and its design method. Firstly, by calculating the theoretical values using the theoretical formulas and simulating the practical optimized values by utilizing a computer running a finite element simulating software such as COMSOL MULTIPHYSICS, the structure of the HC-ARF with NSRs can be obtained. Secondly, according to the simulated CL at 1550 nm, the simulated CL spectra, the simulated light intensity distributions and the simulated BL of the HC-ARF with NSRs, the HC-ARF with NSRs is shown to have low CL, large bandwidth, simple structure and well very good bending characteristics.

What is claimed is:

1. A hollow-core antiresonant fiber (HC-ARF) with nested supporting rings (NSRs), comprising from inside out a fiber core, a first silica antiresonant ring (SARR), a first air antiresonant ring (AARR), a second SARR, a second AARR and an external silica wall;
    wherein a first NSR is disposed within the first AARR and a second NSR is disposed within the second AARR;
    wherein the first SARR, the first AARR, the second SARR and the second AARR are concentric annular structures centered at a center point of the fiber core;
    the first NSR has an inner wall substantially tangent to an outer side of the first SARR at a first nested point, which is inside the inner wall of the first NSR at a first radial nested depth, and the first NSR has an outer wall substantially tangent to an inner side of the second SARR at a second nested point, which is inside the outer wall of the first NSR at a second radial nested depth;
    the second NSR has an inner wall substantially tangent to an outer side of the second SARR at a third nested point, which is inside the inner wall of the second NSR at a third radial nested depth, and the second NSR has an outer wall substantially tangent to an inner side of the external silica wall at a fourth nested point, which is inside the outer wall of the second NSR at a fourth radial nested depth; and
    a line connecting the first and second nested points and a line connecting the third and fourth nested points both intersect the center point of the fiber core.

2. The HC-ARF with NSRs as claimed in claim 1, wherein the radius of the fiber core is about 20 μm, the first SARR has a thickness of about 1910 nm and the second SARR has a thickness of about 1175 nm.

3. The HC-ARF with NSRs as claimed in claim 2, wherein the first AARR and the second AARR each have a thickness of about 13 μm.

4. The HC-ARF with NSRs as claimed in claim 3, wherein the line connecting the first nested point and the second nested point is perpendicular to the line connecting the third nested point and the fourth nested point at the center point.

5. The HC-ARF with NSRs as claimed in claim 4, wherein the first NSR and the second NSR each have a silica resonant thickness of 570 nm, and the first, second, third and fourth nested depths are each about 28.5 nm.

6. The HC-ARF with NSRs as claimed in claim 2, wherein the line connecting the first nested point and the second nested point is perpendicular to the line connecting the third nested point and the fourth nested point at the center point.

7. The HC-ARF with NSRs as claimed in claim 1, wherein the radius of the fiber core is about 20 μm, and the first AARR and the second AARR each have a thickness of about 13 μm.

8. The HC-ARF with NSRs as claimed in claim 1, wherein the line connecting the first nested point and the second nested point is perpendicular to the line connecting the third nested point and the fourth nested point at the center point.

9. The HC-ARF with NSRs as claimed in claim 1, wherein the first and second nested depths are each about one twentieth of a thickness of the first NSR, and the third and fourth nested depths are each about one twentieth of a thickness of the second NSR.

10. The HC-ARF with NSRs as claimed in claim 1, wherein the radius of the fiber core is about 20 µm, and the first NSR and the second NSR each have a silica resonant thickness of about 570 nm.

11. A method of designing the HC-ARF with NSRs of claim 1 for a given transmission wavelength and a given radius of the fiber core, the comprising the following steps utilizing a computer running a finite element simulating software:
   (1) determining the thickness t1 of the first SARR and the thickness t2 of the second SARR;
   (2) determining the thickness of the first AARR and the thickness of the second AARR;
   (3) setting the silica resonant thickness p1 of the first NSR and the silica resonant thickness p2 of the second NSR;
   (4) determining the locations of the first, second, third, and fourth nested points;
   (5) determining the first, second, third and fourth nested depths; and
   (6) for the nested depths obtained in step (5), updating values of p1 and p2, and then updating values of the nested depths with the updated values of p1 and p2.

12. The method of designing the HC-ARF with NSRs as claimed in claim 11, wherein step (1) comprises:
   calculating two theoretical values of t1 and t2 using the formula;

$$t = \frac{(2m+1)\lambda}{4\sqrt{n^2-1}}$$

where m=1 and m=2, $\lambda$ is the given transmission wavelength; and n is the refractive index of silica, which is 1.445;
   setting t1=t2, finding a first optimized value of t by calculating simulated confined loss (CL), assuming no NSRs, over a range of t covering the theoretical value of t corresponding to m=1, by running the finite element simulating software on the computer;
   setting t1=t2, finding a second optimized value of t by calculating simulated confined loss (CL), assuming no NSRs, over a range of t covering the theoretical value of t corresponding to m=2, by running the finite element simulating software on the computer;
   setting t1 to either the first or second optimized value of t; and
   setting t2 to either the first or second optimized value of t.

13. The method of designing the HC-ARF with NSRs as claimed in claim 12, wherein step (3) comprises:
   calculating a theoretical value of p1 and p2 using the formula $$p = \frac{s\lambda}{2\sqrt{n^2-1}}$$

where s=1; $\lambda$ is the given transmission wavelength, and n is the refractive index of silica, which is 1.445;
   setting p2=0, and calculating simulated confined loss (CL) over a range of p1 covering the theoretical value of p, by running the finite element simulating software on the computer, to find an optimum value of p1, where the simulated CL is lowest;
   setting p1 to the optimum value of p1, and calculating simulated confined loss (CL) over a range of p2 covering the optimum value of p1 while keeping p1 unchanged, by running the finite element simulating software on the computer, to find an optimum value of p2, where the CL is lowest; and
   setting p2 to the optimum value of p2.

14. The method of designing the HC-ARF with NSRs as claimed in claim 12, wherein step (3) comprises:
   calculating a theoretical value of p1 and p2 using the formula $$p = \frac{s\lambda}{2\sqrt{n^2-1}}$$

where s=1; $\lambda$ is the given transmission wavelength, and n is the refractive index of silica, which is 1.445;
   setting p1=p2, and calculating simulated confined loss (CL) over a range of p1 covering the theoretical value of p, by running the finite element simulating software on the computer, to find an optimum value of p1=p2, where the simulated CL is lowest;
   setting p1 and p2 to the optimum value.

15. The method of designing the HC-ARF with NSRs as claimed in claim 14, wherein the four nested points are determined in step (4) to be located in a way such that the line connecting the first and second nested points is perpendicular to the line connecting the third and fourth nested points.

16. The method of designing the HC-ARF with NSRs as claimed in claim 15, wherein in step (5) the four nested depths are set to be all the same and equal to q, which is one twentieth of p1 or p2 obtained in step (3).

17. The method of designing the HC-ARF with NSRs as claimed in claim 16, wherein in step (6) the value of p1 or p2 is updated by performing step (3) again using the value of q obtained in step (5), and then the nested depths are reset to one twentieth of the updated value of p1 or p2.

18. The method of designing the HC-ARF with NSRs as claimed in claim 11, wherein the four nested points are determined in step (4) to be located in a way such that the line connecting the first and second nested points is perpendicular to the line connecting the third and fourth nested points.

19. The method of designing the HC-ARF with NSRs as claimed in claim 11, wherein step (2) comprises:
   setting a theoretical value of thickness to 0.65r, where r is the radius of the fiber core;
   setting t1=1910 nm and t2=1175 nm, and finding an optimum value of thickness by calculating simulated confined loss (CL), under the condition that the thickness of the first AARR is always the same as the thickness of the second AARR, over a range of the thickness of the first AARR covering the theoretical value of thickness, by running the finite element simulating software on the computer; and
   setting the thicknesses of the first AARR and the thickness of the second AARR both to the optimum value of thickness.

20. The method of designing the HC-ARF with NSRs as claimed in claim 11, wherein in step (2) the thickness of the first AARR and the thickness of the second AARR are both determined to be 0.65r, where r is the radius of the fiber core.

* * * * *